US012033523B2

(12) United States Patent
Borgyos et al.

(10) Patent No.: US 12,033,523 B2
(45) Date of Patent: Jul. 9, 2024

(54) APPARATUS, SYSTEMS, AND METHODS FOR PROVIDING SURVEILLANCE SERVICES FOR UNMANNED AIRCRAFT

(71) Applicants: GE Aviation Systems LLC, Grand Rapids, MI (US); Vineet Mehta, Grand Rapids, MI (US)

(72) Inventors: Szabolcs Borgyos, Grand Rapids, MI (US); Vineet Mehta, Grand Rapids, MI (US); Kenneth Stewart, Somerville, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 2 days.

(21) Appl. No.: 17/781,324

(22) PCT Filed: Dec. 4, 2020

(86) PCT No.: PCT/US2020/063280

§ 371 (c)(1),
(2) Date: May 31, 2022

(87) PCT Pub. No.: WO2021/113619

PCT Pub. Date: Jun. 10, 2021

(65) Prior Publication Data

US 2023/0010838 A1 Jan. 12, 2023

Related U.S. Application Data

(60) Provisional application No. 62/943,656, filed on Dec. 4, 2019.

(51) Int. Cl.
*G08G 5/00* (2006.01)

(52) U.S. Cl.
CPC ......... *G08G 5/0082* (2013.01); *G08G 5/0013* (2013.01); *G08G 5/0026* (2013.01); *G08G 5/0069* (2013.01)

(58) Field of Classification Search
CPC .. G08G 5/0082; G08G 5/0013; G08G 5/0026; G08G 5/0069

(Continued)

(56) References Cited

U.S. PATENT DOCUMENTS 5,327,570 A * 7/1994 Foster ................. G06F 13/4018
712/30
2010/0039310 A1 * 2/2010 Smith .................... G08G 5/045
342/29

(Continued)

OTHER PUBLICATIONS

International Search Report & Written Opinion dated Mar. 15, 2021 pertaining to PCT Application No. PCT/US2020/063280 filed Dec. 4, 2020, pp. 1-12.

*Primary Examiner* — Kerri L McNally
(74) *Attorney, Agent, or Firm* — Dinsmore & Shohl LLP

(57) ABSTRACT

Systems and methods for providing surveillance services for an unmanned vehicle are described herein. One embodiment of a method includes receiving surveilled data from a surveillance monitor regarding the unmanned aerial vehicle and at least one other aircraft, receiving trajectory data from at least one trajectory data source, and comparing the surveilled data with the trajectory data to determine whether the unmanned aerial vehicle is on path to collide with a third party aerial vehicle. In some embodiments, in response to determining that the unmanned aerial vehicle is on path to collide with the third party aerial vehicle, the method includes determining an alternate route for the unmanned aerial vehicle; and communicating at least a portion of the alternate route to the unmanned aerial vehicle.

17 Claims, 14 Drawing Sheets

(58) Field of Classification Search
USPC .......................................................... 340/945
See application file for complete search history.

(56) References Cited

U.S. PATENT DOCUMENTS

| | | | | |
|---|---|---|---|---|
| 2016/0171896 | A1 | 6/2016 | Buchmueller et al. | |
| 2019/0019418 | A1* | 1/2019 | Tantardini ............ | G08G 5/0069 |
| 2019/0121371 | A1* | 4/2019 | Russell ................ | G05D 1/0061 |
| 2019/0236966 | A1* | 8/2019 | Borgyos ............... | G08G 5/0069 |
| 2019/0355263 | A1 | 11/2019 | Priest | |
| 2020/0202729 | A1* | 6/2020 | Tam ...................... | B64C 39/024 |
| 2021/0082208 | A1* | 3/2021 | Surace ................. | G08G 5/0013 |

* cited by examiner

APPARATUS, SYSTEMS, AND METHODS FOR PROVIDING SURVEILLANCE SERVICES FOR UNMANNED AIRCRAFT

CROSS-REFERENCE TO RELATED APPLICATIONS

This application is a National Stage Entry under 35 U.S.C. § 371 of International Patent Application No. PCT/US2020/063280, filed Dec. 4, 2020, which claims the benefit to U.S. Provisional Application No. 62/943,656, entitled "APPARATUS, SYSTEM, AND METHOD OF PROVIDING SURVEILLANCE SERVICES FOR UNMANNED AIRCRAFT," filed Dec. 4, 2019, which is hereby incorporated by reference in its entirety.

TECHNICAL FIELD

The disclosure relates generally to aircraft services, and, more particularly, to an apparatus, a computer-implemented system, and method of providing surveillance services for an unmanned aerial vehicle.

BACKGROUND

Few technologies today command as much interest and excitement as aerial vehicles, such as unmanned aerial vehicles. While current implementations have included governmental uses, it has been proposed that unmanned aerial vehicles be further expanded into commercial services, such as safety and security, product delivery, real estate and surveys, and so on.

While the growth in applications for aerial vehicles presents economic opportunity, it also presents significant challenges, such as to first responders, safety and security personnel, and other aircraft such as may be monitored by the Federal Aviation Administration (FAA). By way of example, there is no system in place presently to manage airspace for unmanned aerial vehicles. Similarly, there is no autonomous mechanism to provide an approval process for unmanned aerial vehicle missions, and thus such flights often occur without proper approvals or with incomplete mission plans. Because of this, there may be detrimental impact on aircraft having FAA approved flight plans, and on first responder activity, stemming from unmanaged, improper, and/or unnecessarily dangerous operation of an unmanned aerial vehicle.

Although the FAA has a registration process for airspace (as do some local authorities and agencies), typically the approval process to restrict airspace takes 24 hours or more. Because of this, many unmanned aerial vehicles fail to pursue flight plan approvals, and it difficult to distinguish un-authorized aircraft from authorized aircraft in a restricted airspace in real time. It is also difficult to punish owners or operators of unauthorized aircraft. Thus, a need exists in the industry for providing surveillance services for unmanned aerial vehicle.

SUMMARY

Systems and methods for providing surveillance services for an unmanned vehicle are described herein. One embodiment of a method includes receiving surveilled data from a surveillance monitor regarding the unmanned aerial vehicle and at least one other aircraft, receiving trajectory data from at least one trajectory data source, and comparing the surveilled data with the trajectory data to determine whether the unmanned aerial vehicle is on path to collide with a third party aerial vehicle. In some embodiments, in response to determining that the unmanned aerial vehicle is on path to collide with the third party aerial vehicle, the method includes determining an alternate route for the unmanned aerial vehicle and communicating at least a portion of the alternate route to the unmanned aerial vehicle.

In another embodiment, a system includes an air mobility platform that includes a surveillance fusion engine that receives surveilled data from a surveillance monitor regarding the unmanned aerial vehicle and at least one other aircraft, and a comparator for comparing the surveilled data with trajectory data from at least one trajectory data source to determine whether the unmanned aerial vehicle is on path to collide with a third party aerial vehicle. In response to determining that the unmanned aerial vehicle is on path to collide with the third party aerial vehicle, the comparator may cause the air mobility platform to determine an alternate route for the unmanned aerial vehicle. Some embodiments include a surveillance uplink application configured to communicate at least a portion of the alternate route to the unmanned aerial vehicle.

In yet another embodiment, a non-transitory computer-readable medium includes logic that, when executed by a computing device, causes the computing device to receive surveilled data from a surveillance monitor regarding an unmanned aerial vehicle and at least one other aircraft, receive trajectory data from at least one trajectory data source, and compare the surveilled data with the trajectory data to determine whether the unmanned aerial vehicle is on path to collide with a third party aerial vehicle. In some embodiments, the logic causes the computing device to, in response to determining that the unmanned aerial vehicle is on path to collide with the third party aerial vehicle, determine an alternate route for the unmanned aerial vehicle and communicate at least a portion of the alternate route to the unmanned aerial vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing surveillance services for a vehicle. These embodiments may include a surveillance monitor and a surveillance fusion engine configured to receive surveilled data from the surveillance monitor. These embodiments may include a comparator for comparing the surveilled data to the trajectory data source and an uplink module configured to provide the comparison from the surveillance fusion engine to the unmanned aerial vehicle.

Embodiments described herein utilize a single user interface across a plurality of applications and modules integrated with the services architecture. This provides a user with a more cohesive flight planning and monitoring experience. These embodiments may reduce code duplication and back-end processing by providing tunnel access to third party data for services and applications registered to the services architecture. Embodiments may also provide a gateway that limits any cross data flow as between applications or modules, except in circumstances where a user is also an authorized user of each of those independent applications. Some embodiments may reduce the need for independent access to each of a large number of separate applications in order to generate a flight plan and/or to perform flight monitoring.

Figure 1:
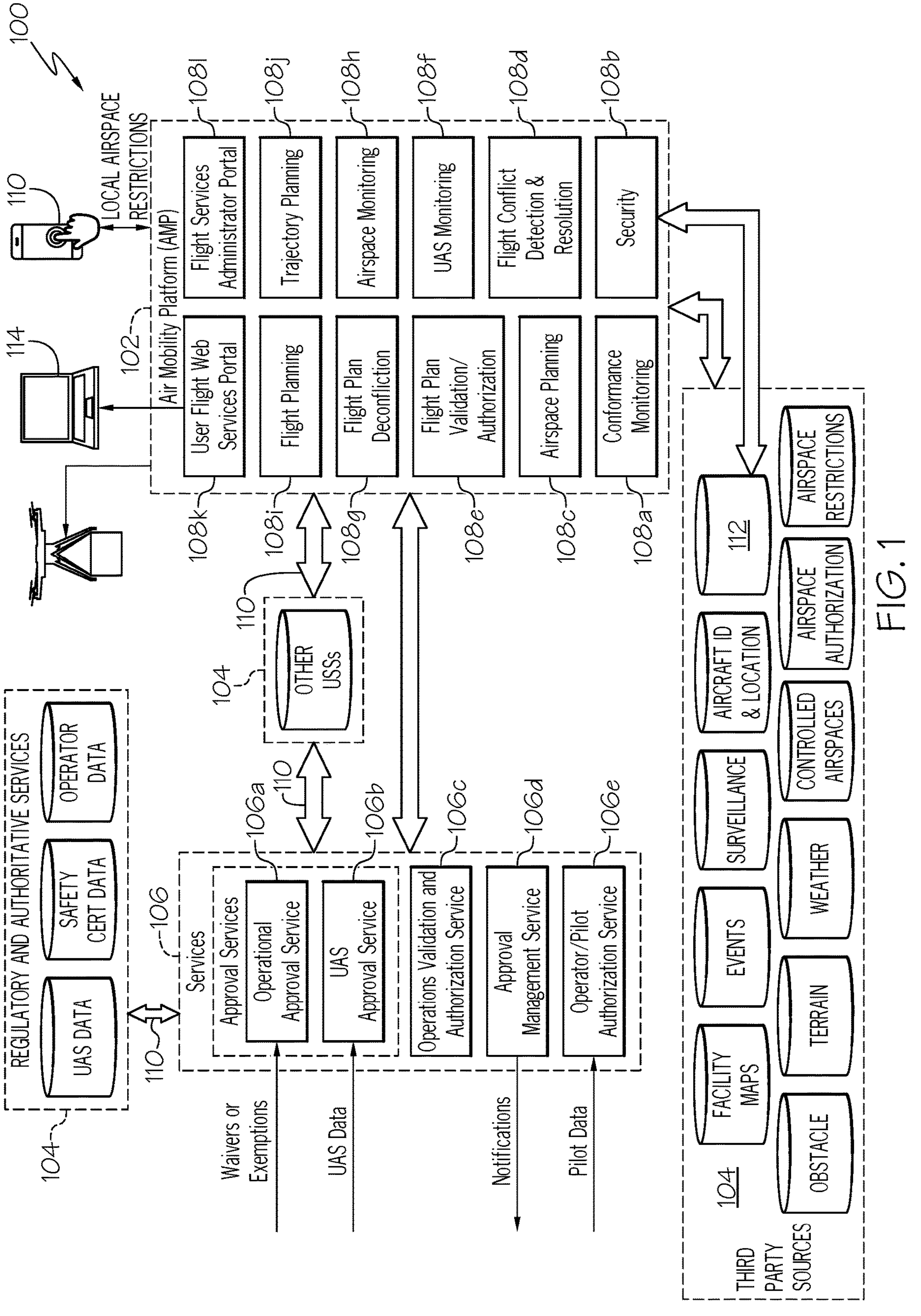
FIG. 1 depicts an architecture for providing surveillance services for a vehicle, according to embodiments provided herein.

Referring now to the drawings, FIG. 1 depicts an architecture 100 for providing surveillance services for a vehicle, according to embodiments provided herein. As illustrated, the architecture 100 provides an air mobility platform 102 that is communicative with third party data sources 104 to autonomously provide an operational approval service 106*a*, an aerial vehicle approval service 106*b*, an operations validation and operations authorization service 106*c*, an approval management service 106*d*, and an operator/pilot authorization service 106*e* (collectively "UA-centric services 106"). The air mobility platform 102 may be provided by one or more computing devices, such as those depicted in FIG. 14. The third party data sources 104 may be rules-based, non-rules based, informationally based, etc. As an example, some embodiments may provide multilayer services for an unmanned aerial vehicle, manned aircraft, equipment, weather, ground control, and/or operational services.

The air mobility platform 102 may include one or more applications 108, such as a conformance monitoring application 108*a*, a security application 108*b*, an airspace planning application 108*c*, a conflict detection and resolution application 108*d*, a flight plan validation/authorization application 108*e*, an aerial vehicle monitoring application 108*f*, a flight plan deconfliction application 108*g*, an airspace monitoring application 108*h*, a flight planning application 108*i*, a trajectory planning application 108*j*, a user flight web services portal application 108*k*, and a flight services administrator portal application 108*l* (collectively referred to as "applications 108"). The UA-centric services 106 may provide an operating system for native or external engines, modules, and applications, such as the applications 108. The applications 108 may each include modules or applications that draw on the third party data sources 104. The third party data sources 104 may include aerial vehicle data, safety certification data, operator data, other USS data, facility maps data, events, surveillance data, aircraft identification and location data, obstacle data, terrain data, weather data, controlled airspaces data, airspace authorization data, airspace restrictions data, and/or other third party data sources 112.

The third party data sources 104 may include rules, the result of externally applied rules, public or privately available information, data models, approval models such as may be provided in relation to aircraft registration, operator registrations, relevant identity certifications of aircraft and/or operators, flight plan submissions, mission requests, capabilities verifications, testing data, simulation data, etc. As such, the third party data sources 104 may extend beyond typical aircraft aspects, including but not limited to authoritative data provided by other rulemaking or governmental bodies, such as the FCC in relation to radiofrequency operation within FCC bandwidth guidelines, or the National Weather Service, etc.

The air mobility platform 102 may also provide interaction with the applications 108 over any of a plurality of communication sockets 110 that may apply security features and a user interface 114 (one or more). The air mobility platform 102 may provide the UA-centric services 106 and such as may include the planning, approval, and modification of airspace rules (such as exclusionary management for first responders/no fly zones as they arise, and the like), aircraft or user profiles, submitted mission requests, conformance with flight plans, confliction of flight plans, conflict resolution, etc. This data may be communicated between the disclosed air mobility platform 102 over a multi-level bus 330, such as for display on the user interface 114.

The air mobility platform 102 may interact with the third party data sources 104, such as but not limited to authoritative, governmental, historical, simulation, and weather-related sources. For example, third party aircraft and ground-based surveillance may be monitored and data obtained therefrom. Obstacle detection sites, such as terrain, geographical and structural assessment may be accessed. Weather forecasting may be accessed for any area relevant to the mission requested. Aircraft use, capability, health, and performance data may be assessed. Current airspace activity by other aircraft, no fly zones, and the like may also be monitored.

That is, the architecture 100 may enable and control the communication sockets 110 to the third party data sources 104, and may select therefrom relevant data unique to each request for the UA-centric services 106 for use by the decision-making aspects of architecture 100. Thereby, the UA-centric services 106 may be provided in real time, even in the event of submission of a large number of service requests in a variety of different geographies and air spaces substantially simultaneously, and/or where each service utilizes a distinct assessment and manipulation of data unique to each such geography, airspace, or operator.

Figure 2:
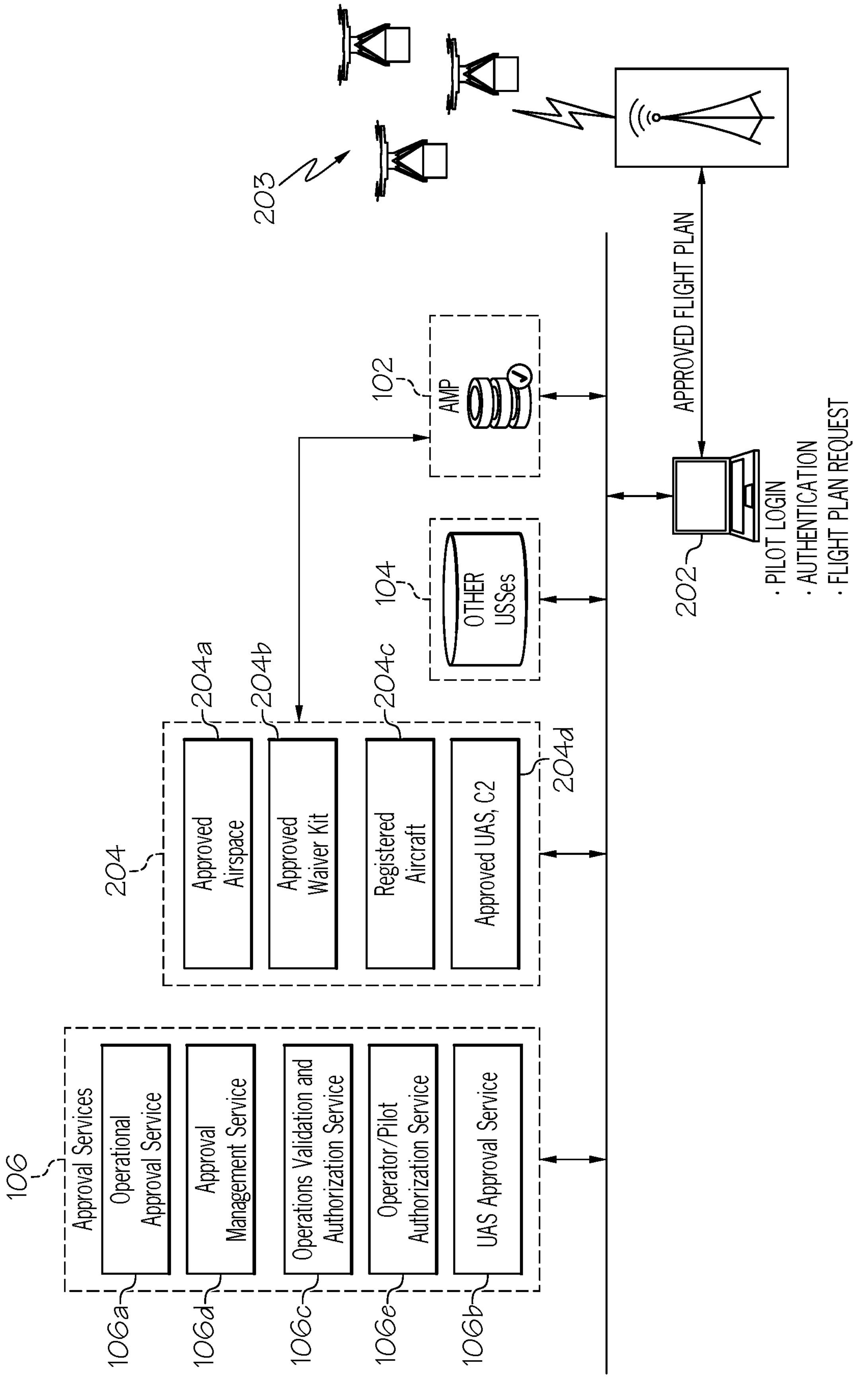
FIG. 2 depicts a computing environment for utilizing the air mobility platform 102 to provide surveillance services for a vehicle, according to embodiments provided herein.

FIG. 2 depicts a computing environment for utilizing the air mobility platform 102 to provide surveillance services for an aerial vehicle 203 (which may be configured as an unmanned aerial vehicle), according to embodiments provided herein. As illustrated, a user of a user computing device 202 may access a user interface 114 (FIG. 1) provided by the air mobility platform 102 to make a service request for one or more of the UA-centric services 106 and/or service data 204 for the aerial vehicle 203. As illustrated, the UA-centric services 106 of this embodiment may an operational approval service 106*a*, an approval management service 106*d*, an operations validation and authorization service 106*c*, an operator/pilot approval service 106*e*, and an aerial vehicle approval service 106*b*. The service data 204 in this embodiment may include approved airspace data 204*a*, an approved waiver kit 204*b*, registered aircraft data 204*c*, and approved UAS data 204*d*. Similarly, third party data sources 104 (FIG. 1) may make a service request for a third party vehicle.

Depending on the particular embodiment, the service request may include approved airspace reservation, conflict identification, conflict resolution, etc. Upon receiving approval, the user computing device 202 (which may or may not be the same computing device that requested the service) may control the aerial vehicle 203 according to the UA-centric service 106 that was requested.

Figure 3:
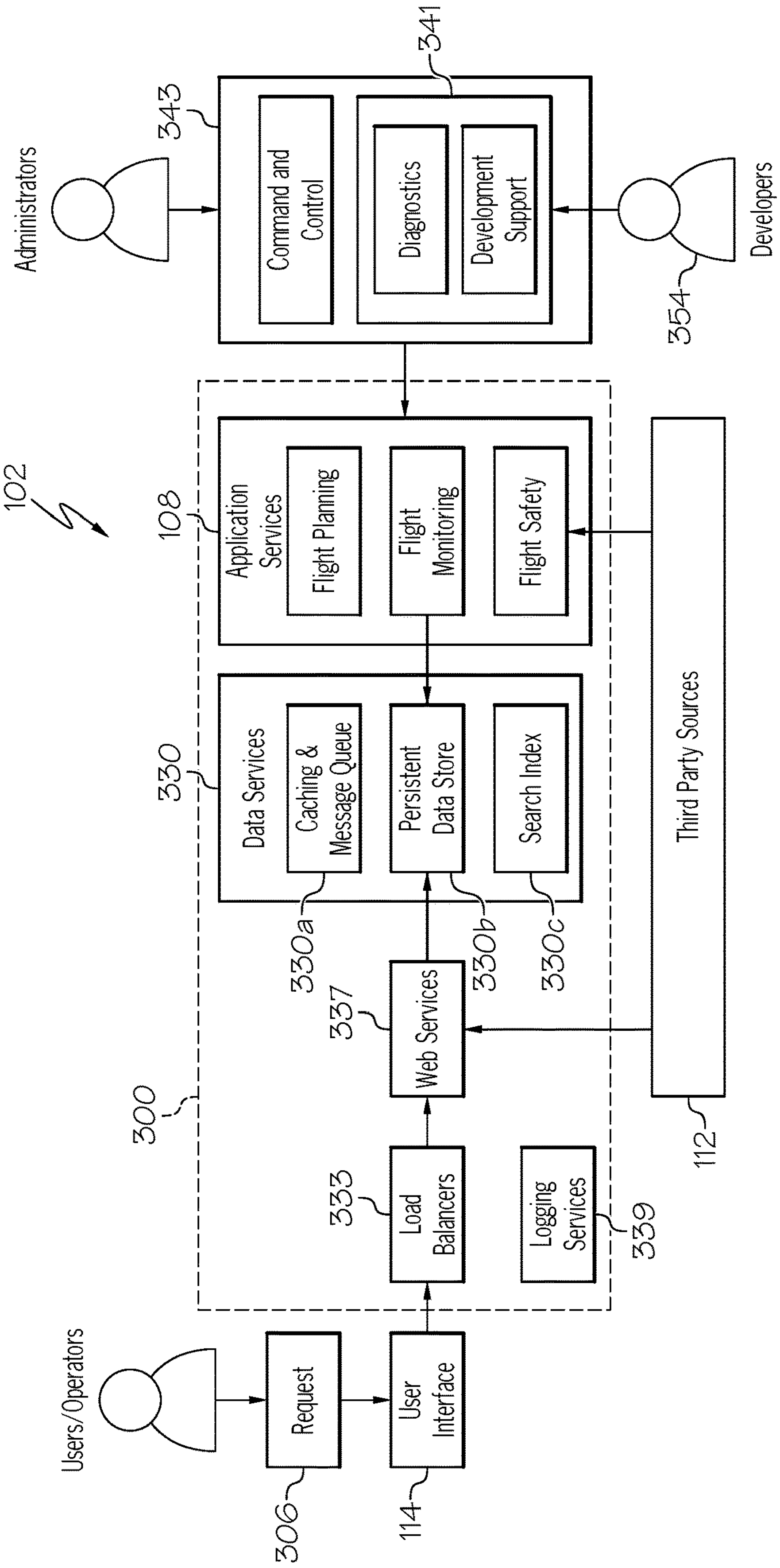
FIG. 3 depicts a services architecture for providing surveillance services for an aerial vehicle 203, according to embodiments provided herein.

FIG. 3 depicts a services architecture 300 for providing surveillance services for an aerial vehicle 203, according to embodiments provided herein. As illustrated, the services architecture 300 may be part of the air mobility platform 102 (FIG. 1) and may provide access to applications 108 that provide the requested services 306. As described with reference to FIG. 1, the applications 108 may include a flight planning application 108*i*, a flight monitoring application, a flight safety application, and/or other applications. The services architecture 300 may provide administrative and/or user access to presentations of the applications 108, through the user interface 114.

As is further illustrated in FIG. 3, the services architecture 300 may provide operating-system level control over a variety of aspects in execution of the multi-level bus 330. The multi-level bus 330 may include a caching and message queue 330*a*, a persistent data store 330*b*, and a search index 330*c*. Additionally, the services architecture 300 may use the applications 108 to perform the requested services 306 (which may be requested or automatically provided as part of a request). The services architecture 300 may further include load balancers 333, a web services module 337, a logging services module 339, etc.

The services architecture 300 may further provide inputs and outputs for a variety of data and information, such as to and from a user, as well as to and from the third party data sources 104, which may interact with one another and with the applications 108 that include the logic to select which of the requested services 306 are granted, over the multi-level bus 330.

The actions performed may include services provided via the multi-level bus 330 that may or may not be directly related to the requested services 306. As an example, the provided services may include load balancing via a load balancers 333, web and communication link management via the web services module 337, data logging services via a logging services module 339, development support and diagnostics via a support module 341, and administrative services via a command and control module 343. The services architecture 300 may additionally vary in its presentation and deployment to different users, developers, third parties, and administrative entities.

Figure 4:
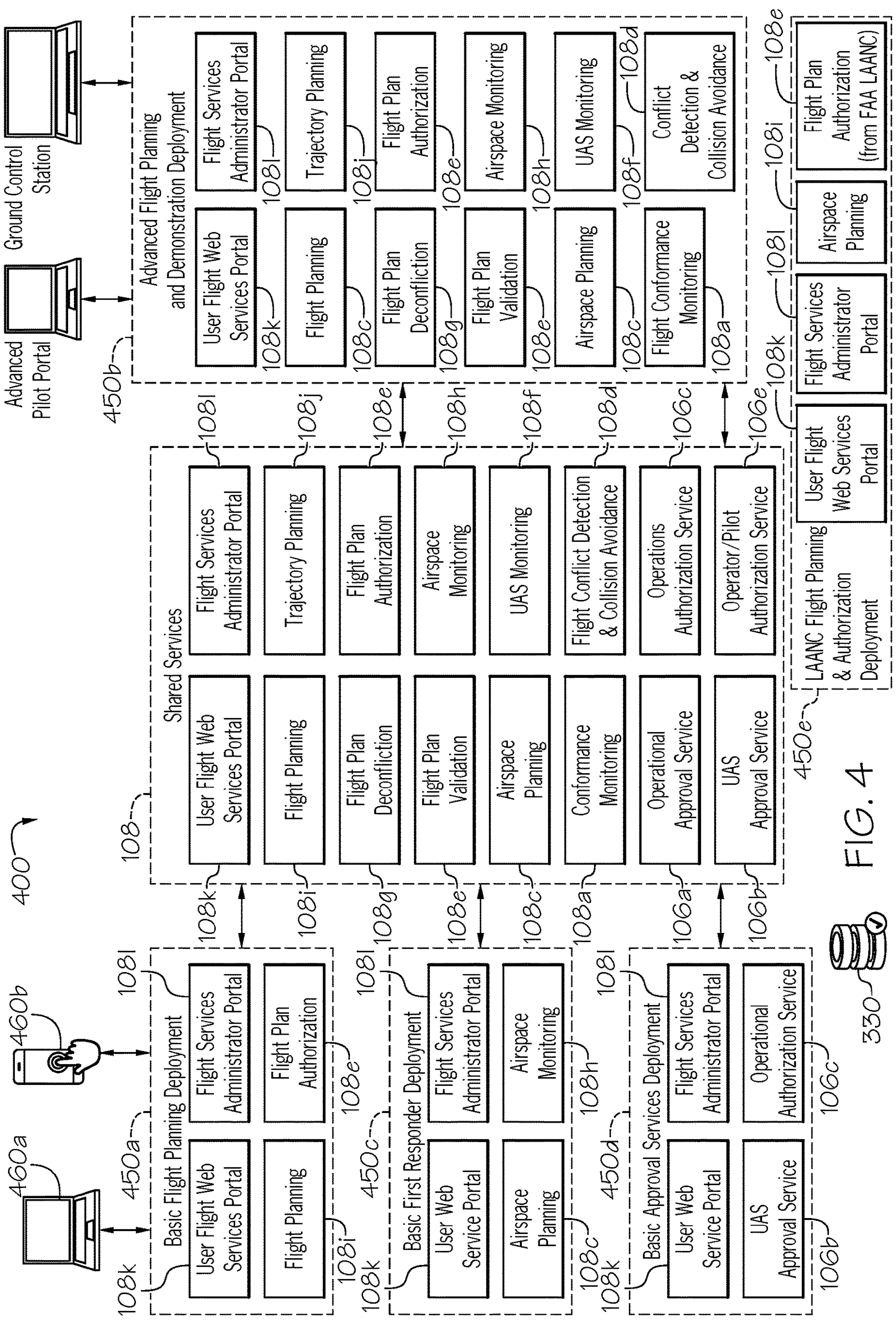
FIG. 4 depicts another services architecture for providing surveillance services showing shared application for one or more different types of applications, according to embodiments provided herein.

FIG. 4 depicts another services architecture 400 for providing surveillance services showing shared application for one or more different types of applications, according to embodiments provided herein. As illustrated, users may receive a deployment of the services architecture 400 to access data and/or the applications 108, such as may relate to a basic functionality level of the multi-level bus 330. In addition to the applications 108*a*-108*l* provided in FIG. 1, the applications 108 may additionally include the operational approval service 106*a*, the operations authorization service 106*c*, the aerial vehicle approval service 106*b*, operator/pilot authorization service 106*e* and/or other UA-centric services 106. The applications 108 and/or UA-centric services 106 that are shared may vary, such as based on a request from a pilot portal computing device 460*a* and/or based on the permissions available for that user's login profile. This data and/or the applications 108 that are provided to this user may also be dependent upon the offerings provided by a basic flight planning deployment infrastructure 450*a* with which the pilot portal computing device 460*a*, the pilot application 460*b*, and/or other pilot controlled devices communicate. This variability in the deployment of the services architecture 400 may be sensed and controlled by the services architecture 400 itself, such as using sensed values by the applications 108 over the multi-level bus 330.

As illustrated in FIG. 4, particular types of users and/or requests may receive access and/or data to and through one or more of the applications 108, such as captive/native applications of the services architecture 400. As an example, a basic flight planning deployment infrastructure 450*a* may share the user flight web services portal application 108*k*, the flight services administrator portal application 108*l*, the flight planning application 108*i*, and the flight plan validation/authorization application 108*e*. Similarly, an advanced flight planning and demonstration deployment infrastructure 450*b* may share the user flight web services portal application 108*k*, the flight services administrator portal application 108*l*, the flight planning application 108*i*, the trajectory planning application 108*j*, the flight plan deconfliction application 108*g*, the flight plan validation/authorization application 108*e*, the airspace monitoring application 108*h*, the airspace planning application 108*c*, the aerial vehicle monitoring application 108*f*, the conformance monitoring application 108*a*, and the conflict detection and resolution application 108*d*.

A basic first responder deployment infrastructure 450*c* may share the user flight web services portal application 108*k*, the flight services administrator portal application 108*l*, the airspace planning application 108*c*, and the airspace monitoring application 108*h*. A basic approval services deployment infrastructure 450*d* may share the user flight web services portal application 108*k*, the flight services administrator portal application 108*l*, the aerial vehicle approval service 106*b*, and the operations authorization service 106*c*.

Similarly, a low altitude authorization and notification capability (LAANC) flight planning and authorization deployment infrastructure 450*e* may share the user flight web services portal application 108*k*, the flight services administrator portal application 108*l*, the flight planning application 108*i*, and the flight plan validation/authorization application 108*e* from (FAA LAANC).

It will be understood that the foregoing deployment of the services architecture 400 may utilized a shared set of non-user facing services/applications. For example, such a shared set of services may include load balancing, communication link provisioning, data storage, generation of alerts, input and output control, security, etc. These shared services may be deployed as one or more interface sockets communicatively associated with each of the unique deployments of the services architecture 400 discussed herein.

Figure 5:
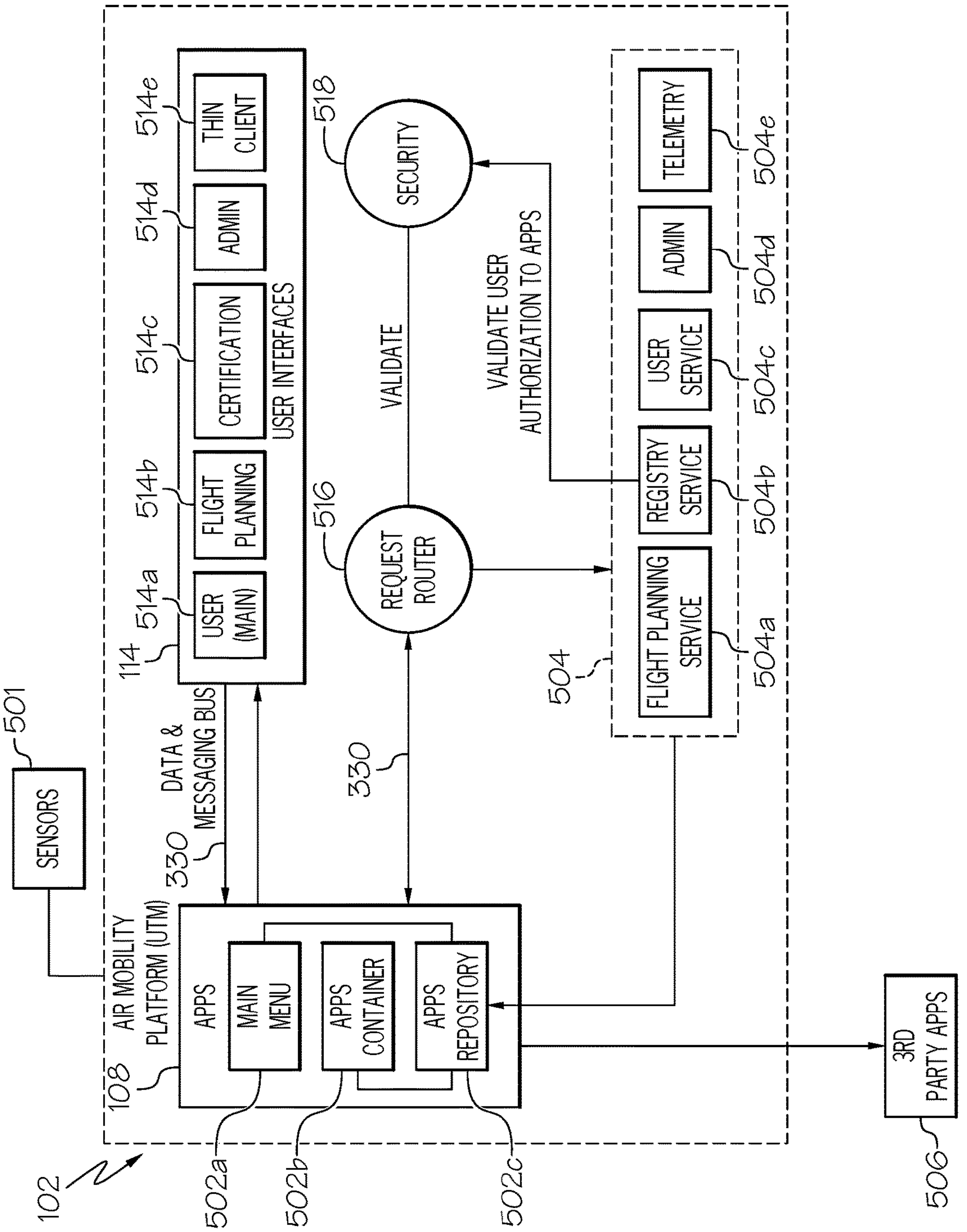
FIG. 5 depicts a depiction of user interfaces provided by the air mobility platform, according to embodiments provided herein.

FIG. 5 depicts a depiction of user interfaces 114 provided by the air mobility platform 102, according to embodiments provided herein. As illustrated, the air mobility platform 102 may provide intermediate processing between certain data inputs, such as: at least one surveillance sensor, such as surveillance sensors 501; applications 108, which may be provided with a user main interface 514*a*, an flight planning interface 514*b*, and an certification interface 514*c*. The native applications 504 may access one or more of the user interfaces 114, such as the certification interface 514*c*. Native applications 502 may include a flight planning service application 504*a*, a registry service application 504*b*, a user service application 504*c*, an administrator application 504*d*, and a telemetry application 504*e*.

The applications 108 may access third party applications 506. The applications 108 may also access the registry service application 502*b* via a request router 516*a* and a security module 518. The applications 108 may provide presentation of one or more user interfaces 514, such as a user main interface 514*a*, a flight planning interface 514*b*, a certification interface 514*c*, an administrator interface 514*d*, and a thin client interface 514*e*.

The user main interface 514*a* may provide access to the one or more of the applications 108 and/or third party applications 506. The air mobility platform 102 may further provide the user interfaces 114 over the multi-level bus 330, which may include levels such as caching and message queue 330*a*, wherefrom one or more data requests and request results may occur; and/or a persistent data store 330*b*, and/or a search index 330*c*.

Figure 6:
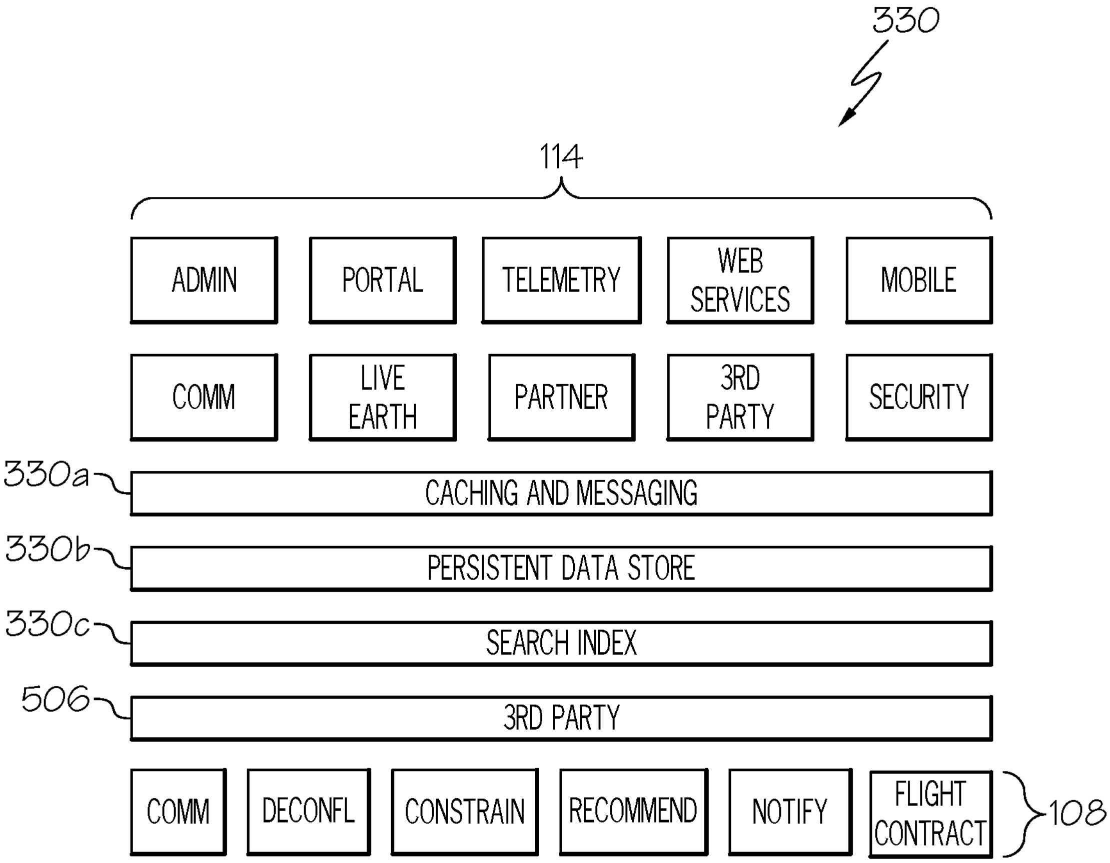
FIG. 6 depicts a multi-level bus for providing surveillance services for a vehicle according to embodiments provided herein.

FIG. 6 depicts a multi-level bus 330 for providing surveillance services for an aerial vehicle 203 according to embodiments provided herein. As illustrated, the multi-level bus 330 may be configured as a layered bus for handling different service levels of information, data and data requests, and/or for handling application communications of different applications operating at different layers. As illustrated, co-resident information and messaging may be exchanged over an in-memory grid bus level, such as the caching and message queue 330*a*, while external information may be exchanged over a database bus level, such as persistent data store 330*b* to one or more captive, co-resident databases and/or to one or more system external third-party databases. A search data bus level, such as search index 330*c* may provide for user search inquiries and/or may provide query response to internal queries from the applications 108 (FIG. 1) and/or the native applications 504 (FIG. 5) stemming from the providing of surveillance services. Also provided are the applications 108, as well as the third party applications 506, and the user interfaces 114. It should be understood that while FIG. 6 depicts three levels of the multi-level bus 330, this is merely an example, as some embodiments may have more or fewer levels.

The user interfaces 114 depicted in FIG. 6 include an administrative portal interface, which may hold administrative code for providing the user interface 114, which may include one or more APIs; a web services interface, a trajectory planning interface, etc. Similarly, the applications 108 may include a deconfliction application, which may insure proposed flight plans and trajectories do not conflict with terrain, other airspaces, other aircraft, other flight plans, assets, structures, etc. The applications 108 may include a messaging application, which may serve environments of the air mobility platform 102 to exchange messages. The applications 108 may include a conformance monitoring application 108*a*, which may check for telemetry conformance with a flight plan contract and alert other systems and operators in the event of nonconformance. In some embodiments, the applications 108 may include a suggestion application, which may suggest alternative flight plans for those rejected by deconfliction. The applications 108 may include a USS gateway application, which may serve as a search and discovery gateway; a push messaging application, which may send push notifications to particular applications 108; a constraint management application, which may manage implications of modifications to current flight rules and restrictions, and/or other applications.

In some embodiments, the applications 108 may include a controlled airspace application, which may serve environments of the air mobility platform 102 to communicate regarding controlled airspaces. The applications 108 may include a partner services application, which may ingest third party data, such as regarding weather, airspace, flight restrictions, flight rules, etc. from trusted third party source. Similarly, the applications 108 may include one or more other applications used in the air mobility platform 102 and as may be apparent to the skilled artisan in light of the disclosure herein.

In accordance with the foregoing, and particularly with respect to the multi-level bus 330 of FIG. 6, a user may engage in data exchanges, messaging, processes, and analyses to form a mission specification and mission request for a particular aerial vehicle 203 for a particular flight. As such, the air mobility platform 102 may enable a performance model, which may include takeoff and landing sites, particular specifications of the aerial vehicle 203, as well as mission objectives. Also represented may be available trajectories, such as maneuver sequences/options, maneuvering capabilities, geographical waypoints, autopilot data needs, communication methodologies available for a particular aerial vehicle 203, etc.

The user may input to the user interface 114 a mission specification, which may be analyzed, and which may be approved, such as including suggested solution trajectories for the requested mission, or which may be failed, by the air mobility platform 102. If an approved trajectory plan is issued, the user may accept the plan or modify the plan through the user interface 114 and the solution trajectory (and/or flight plan) may be uploaded to traffic management aspects, such as unmanned air traffic management systems, ground control systems, etc., such as using the user interfaces 114. The solution trajectory may be uploaded to the aerial vehicle 203, over a network accessible via one of the levels of the multi-level bus 330, and the aerial vehicle 203 may then perform flight in accordance with the uploaded flight plan.

Figure 7:
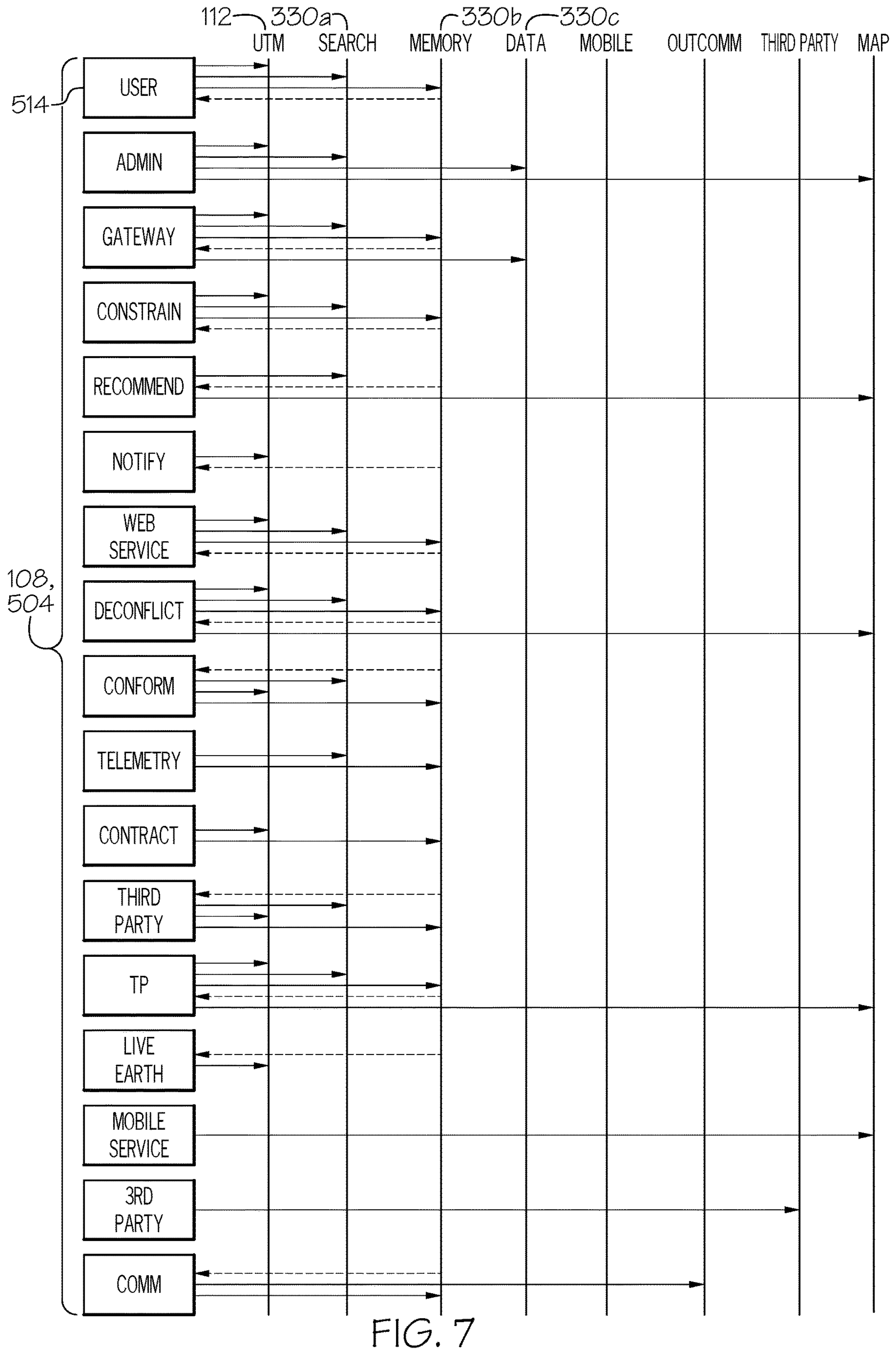
FIG. 7 depicts another example of a multi-level bus for providing surveillance services for a vehicle, according to embodiments provided herein.

FIG. 7 depicts another example of a multi-level bus 330 for providing surveillance services for an aerial vehicle 203, according to embodiments provided herein. As illustrated, the multi-level bus 330 may be configured to provide one or more of the user interfaces 114 (FIGS. 1, 5, 6) to users, where the user interfaces 114 may provide information exchanged over the bus levels heretofore unavailable autonomously regard to the aerial vehicle 203. The applications 108 and native applications 504 may be configured for providing other aspects of a request, both related directly to the request and as background aspects of the request. These services may be provided, both natively and non-natively, by the multi-level bus 330.

As illustrated in the example of FIG. 7, the user application may communicate data with one or more of the third party data sources 104, such as an aerial vehicle traffic management (UTM), the caching and message queue 330*a*, and receive data from the persistent data store 330*b*. The admin application may send data to the third party data sources 104, the caching and message queue 330*a*, search index 330*c*, and a map node. The gateway application may send data to the third party data sources 104, the caching and message queue 330*a*, and the persistent data store 330*b*. The gateway application may receive data back form the persistent data store 330*b* and send data to the search index 330*c*. The constrain application may send data to the third party data sources 104, the search index 330*c*, and the persistent data store 330*b* and receive data back form the persistent data store 330*b*. The recommend application may send data to the search index 330*c*, receive data from the persistent data store 330*b*, and send data to the map node. The notify application may send data to the third party data sources 104 and receive data from the persistent data store 330*b*.

The web service application may send data to the third party data sources 104, the search index 330*c*, and the persistent data store 330*b* and receive data back form the persistent data store 330*b*. The deconflict application may send data to the third party data sources 104, the search index 330*c*, and the persistent data store 330*b*. The deconflict application may receive data back from the persistent data store 330*b* and send data to the map node.

The conform application may receive data from the persistent data store 330*b*, send data to the search index 330*c*, send data to the third party data source 104, and send data to the persistent data store 330*b*. The telemetry application 502*e* may send data to the search index 330*c* and the persistent data store 330*b*. The contract application may send data the search index 330*c* and the persistent data store 330*b*. The third party application may receive data from the persistent data store 330*b* and send data to search index 330*c*, the third party data sources 104, and the persistent data store 330*b*. The TP application may send data to the third party data sources 104, the search index 330*c*, and the persistent data store 330*b*. The TP application may also receive data from the persistent data store 330*b* and send data to the map node.

The live earth application may receive data from the persistent data store 330*b* and send data to the third party data sources 104. The mobile service application may send data to a mobile node. The third party application may send data to the third party node. The communication application may receive data from the persistent data store 330*b*, send data to the outward communication node, and send data to the persistent data store 330*b*.

Figure 8:
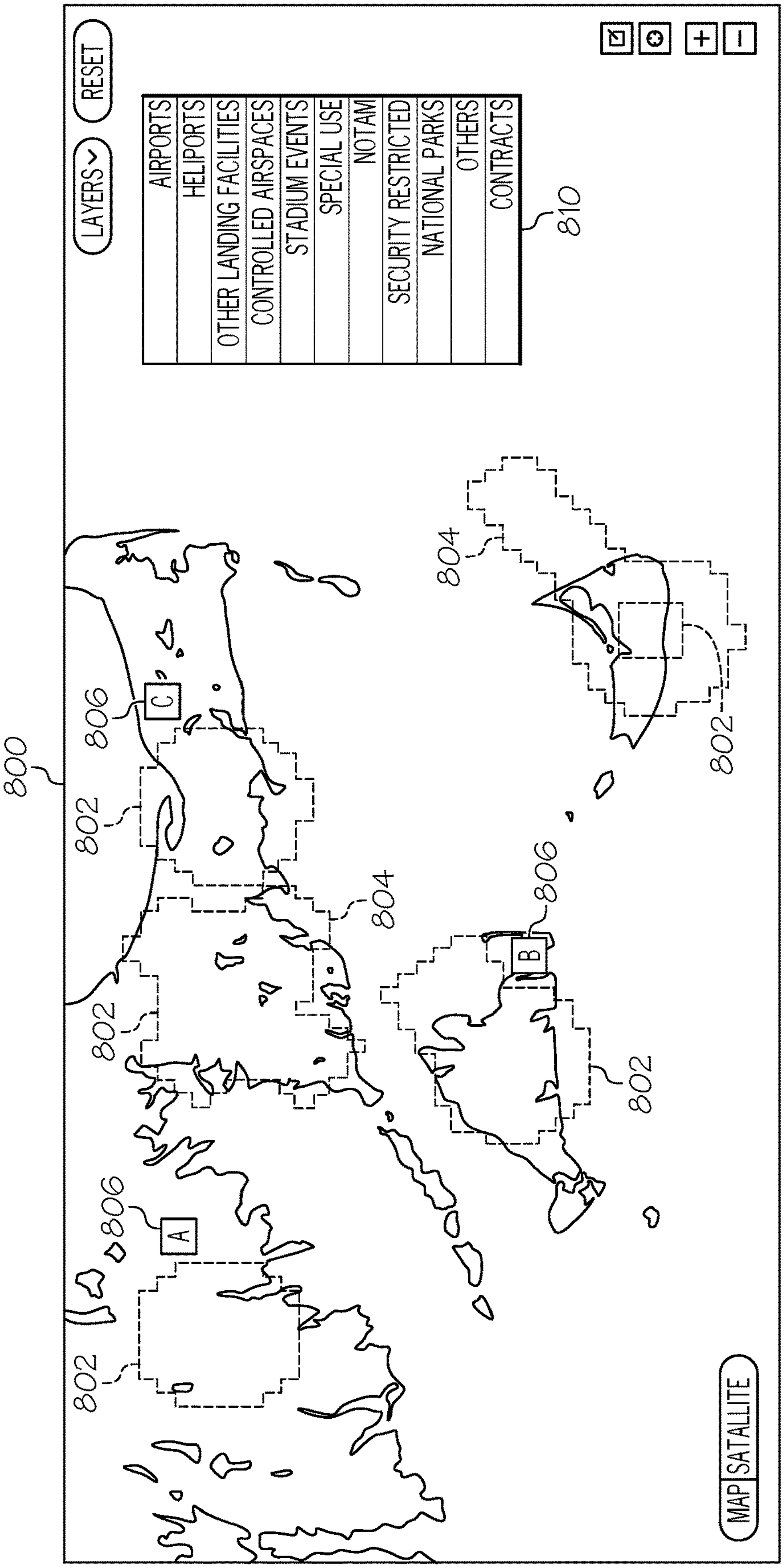
FIG. 8 depicts a user interface that may be provided for surveillance services for a vehicle, according to embodiments provided herein.

FIG. 8 depicts a user interface 800 that may be provided for surveillance services for an aerial vehicle 203, according to embodiments provided herein. As illustrated, the user interface 800 may provide information 802 related to both permanent and temporary restricted airspace, overlaid on a map or lattice grid 804 that includes available waypoints 806 for the user's requested flight plan (the summation of waypoints 806). Also provided is additional information available to the user, such as from a drop-down menu 810, which may include information from third party sources or databases which may affect a submitted mission request.

It will be appreciated that the user may not need to request third party information for mission request, but rather the air mobility platform 102 may assess a need for third party information for a given flight plan request that is entered to the user interface 114, 800. These embodiments may accordingly actuate one of the levels of multi-level bus 330 (FIGS. 3, 5, 6, 7) to obtain such third party information from the third party data sources 104. Although such information availability to the user is illustrated as a drop-down menu in FIG. 8, it will be appreciated that other drill down capabilities to obtain native data and/or third party data may be available to the user.

FIG. 8 also provides additional information available to the user and further indicates processing performed by the air mobility platform 102 on information exchanged over the multi-level bus 330 (FIGS. 3, 5, 6, 7) to provide a user interface 114 to the user. In the example of FIG. 8, the air mobility platform 102 has an added color or shading coding to denote a variety of information to assist the user in developing a mission request, and additionally includes notes to the user as to how best to satisfy current rules and restrictions in order to enable construction of an acceptable mission request.

Accordingly, these embodiments may enable applications-based services for an aerial vehicle 203 that is unique to a service request, and that is relationally applied, such as from one or more databases of the air mobility platform 102 within or communicatively associated with the services architecture or via data or information available from the one or more sockets to a captive rule-set of the air mobility platform 102, and/or from the one or more third party websites. The relationally applied information may include rules, data, static information, dynamic information, etc.

Further, the providing of services may include a weighting and balancing of the various relationally applied factors, where the weighting and balancing may vary in accordance with machine learning over time. For example, factors may be applied based on priority, wherein certain factors are weighted more heavily than other factors in a given services request.

Figure 9:
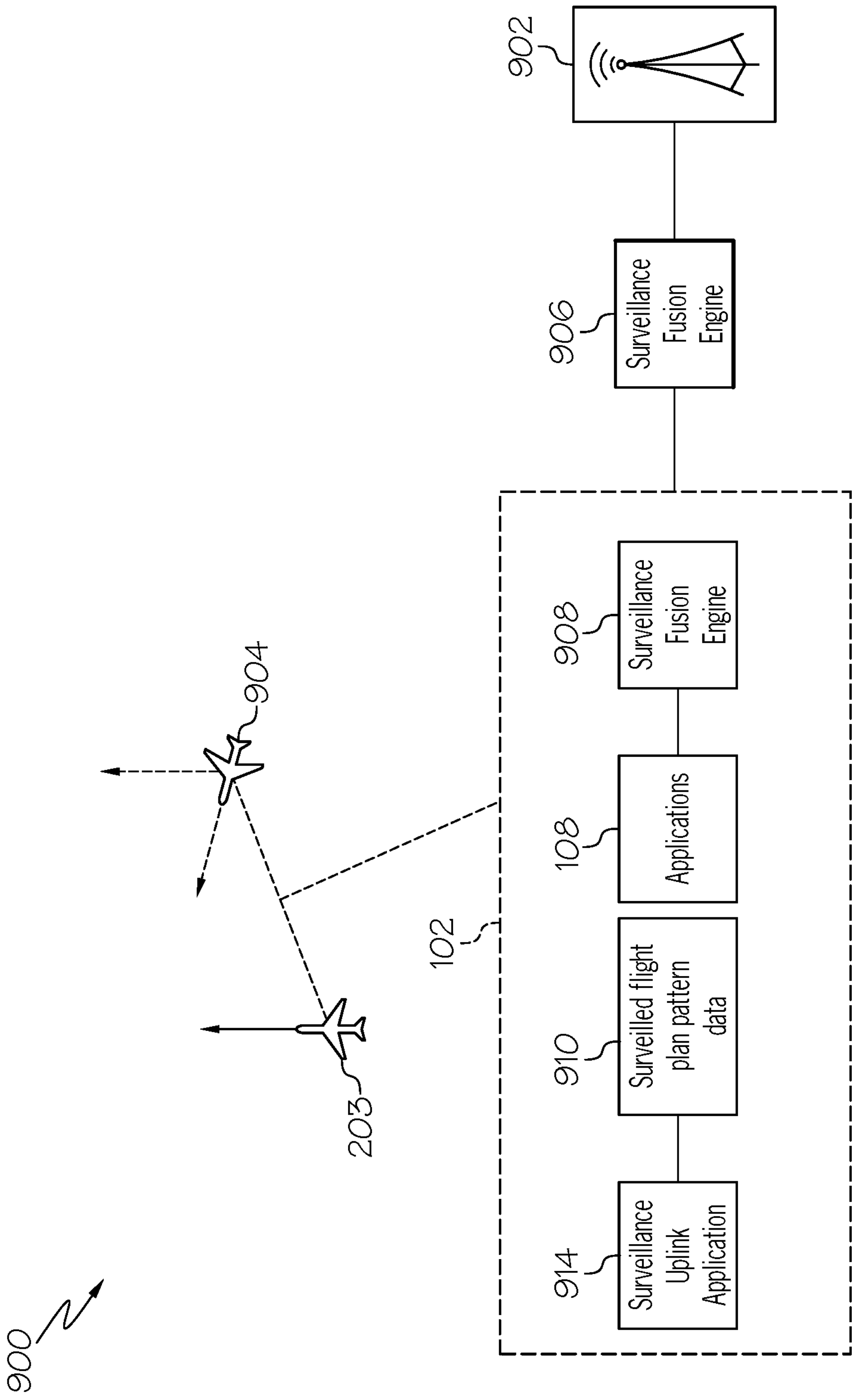
FIG. 9 depicts an unmanned aerial vehicle surveillance system, according to embodiments provided herein.

FIG. 9 depicts an unmanned aerial vehicle surveillance system 900, according to embodiments provided herein. As illustrated, the unmanned aerial vehicle surveillance system 900 may include a surveillance monitoring component 902, such as one or a plurality of surveillance sensors 501 (FIG. 5). The surveillance monitoring component 902 may be ground-based, as illustrated in FIG. 9, or may be partly ground-based and partly on-board an aerial vehicle 203.

This surveillance monitoring component 902 may communicate with a surveillance fusion engine 906, in which surveillance sensed data is combined with other data, such as data from the trajectory planning application 108*j* or other engines, applications or modules discussed herein. This allows for a comparison by the surveillance fusion engine 906 between contracted flight of the aerial vehicle 203, and/or of other aircraft, with the actual flight. As illustrated, surveillance fusion data 908 may be processed by the air mobility platform 102 (see also FIG. 1), which may combine the surveillance fusion data 908 with additional data regarding performance of the aerial vehicle 203, required alerts, etc., in relation to fully form surveilled flight pattern data 910.

This may indicate messaging or data, such as flight modification instructions, to be output from the air mobility platform 102 and uplinked via a surveillance uplink application 914 (which may or may not be included with the applications 108 from FIG. 1) to the aerial vehicle 203 (and/or at least one other vehicle 904) in-flight. This uplink may include any known format for network communication between aerial vehicles 203, 904 in-flight and the air mobility platform 102 (which may be ground-based). As such, the surveillance uplink application 914 may be housed in a computing device, on the vehicle 203, 904, on the user computing device 202 from FIG. 2, etc. that is communicatively coupled with the air mobility platform 102. The surveillance uplink application 914 may additionally be communicative with aerial vehicles 203 that are currently in-flight. This wireless communication between the surveillance uplink application 914 and the aerial vehicle 203 in-flight may occur via any methodology, such as cellular or other radio-frequency communications, satellite communications, etc.

Figure 10:
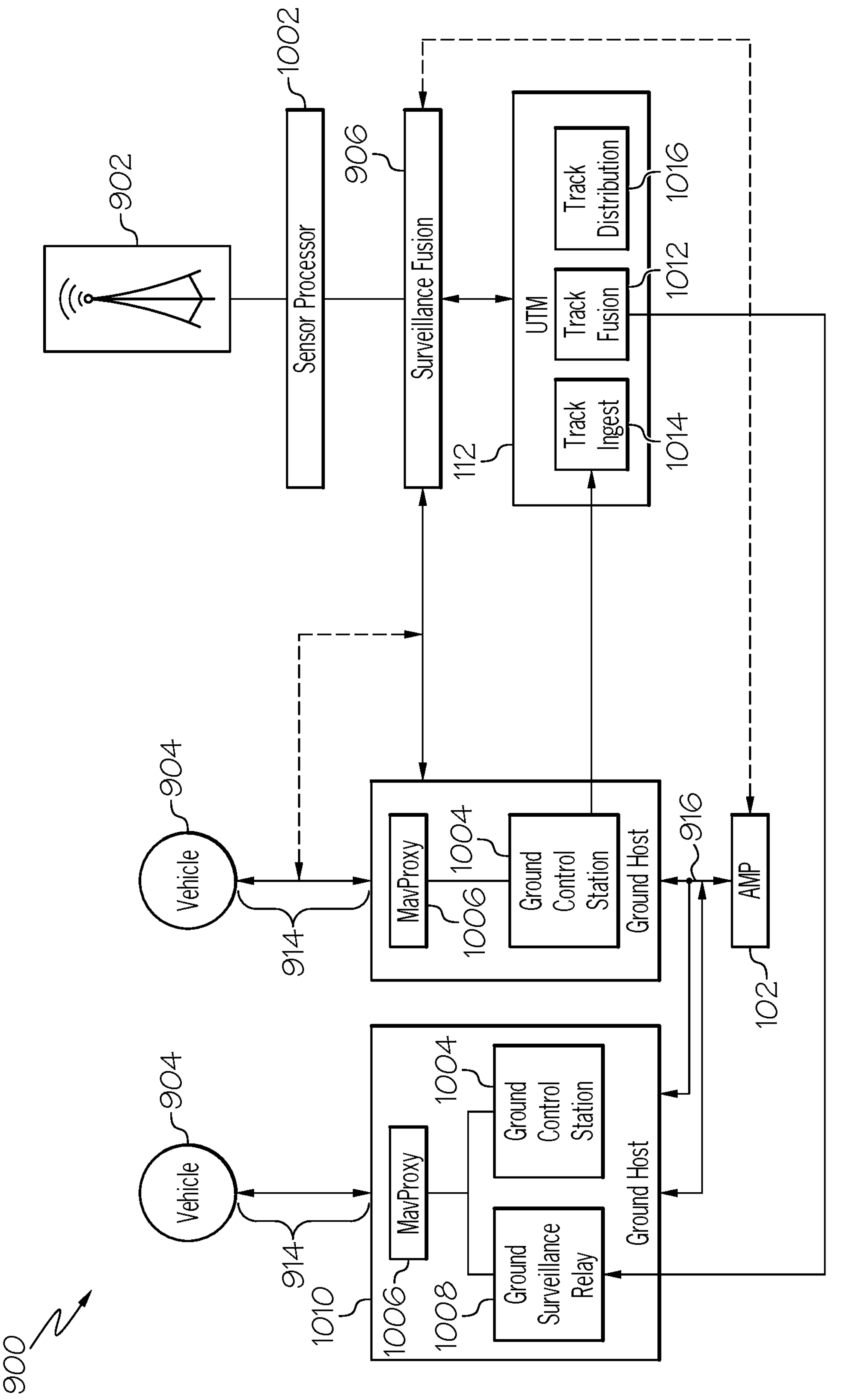
FIG. 10 depicts a communications pathway for providing surveillance services for a vehicle, according to embodiments provided herein.

FIG. 10 depicts a communications pathway for providing surveillance services for a vehicle, according to embodiments provided herein. As illustrated, the surveillance monitoring component 902 may receive sensory data, which may be processed by a sensor processor 1002 (which may be part of the surveillance monitoring component 902). This data may be processed for communication by the surveillance fusion engine 906 (FIG. 9). This surveillance fusion engine 906 may process the data in conjunction with or as part of data processing performed by the air mobility platform 102, and may communicate both with aircraft based control systems, such as ground control station 1004 and third party data sources 104, such as a UTM system.

Accordingly, ground control and/or other ground aircraft surveillance (such as by may proxy 1006, ground surveillance relay 1008, and/or other components of a ground host 1010, which may be embodied as the user computing device 202 from FIG. 2) may be combined with surveillance fusion data 908 and/or the third party data sources 104. The third party data sources may include a track fusion engine 1012, track ingest engine 1014, track distribution engine 1016, etc., which formulate the information, such as data or instructions, for surveillance uplink application 914 to one or more aerial vehicles 203. As discussed above, this uplink may occur by any of a variety of formats, and the communication format and may vary as between networks, third party aerial vehicles 904 that are cooperative, and/or third party aerial vehicles 904 that are non-cooperative. That is, to the extent an aerial vehicle 203 strays from its contracted flight plan and becomes an intruder on another vehicle's 904 flight plan, uplinked instructions may be sent to both the third party aerial vehicles 904 that are cooperating (e.g., compliant) and the third party aerial vehicles 904 that are non-cooperative, with the understanding that only the cooperating vehicle may follow the instructions provided.

Figure 11:
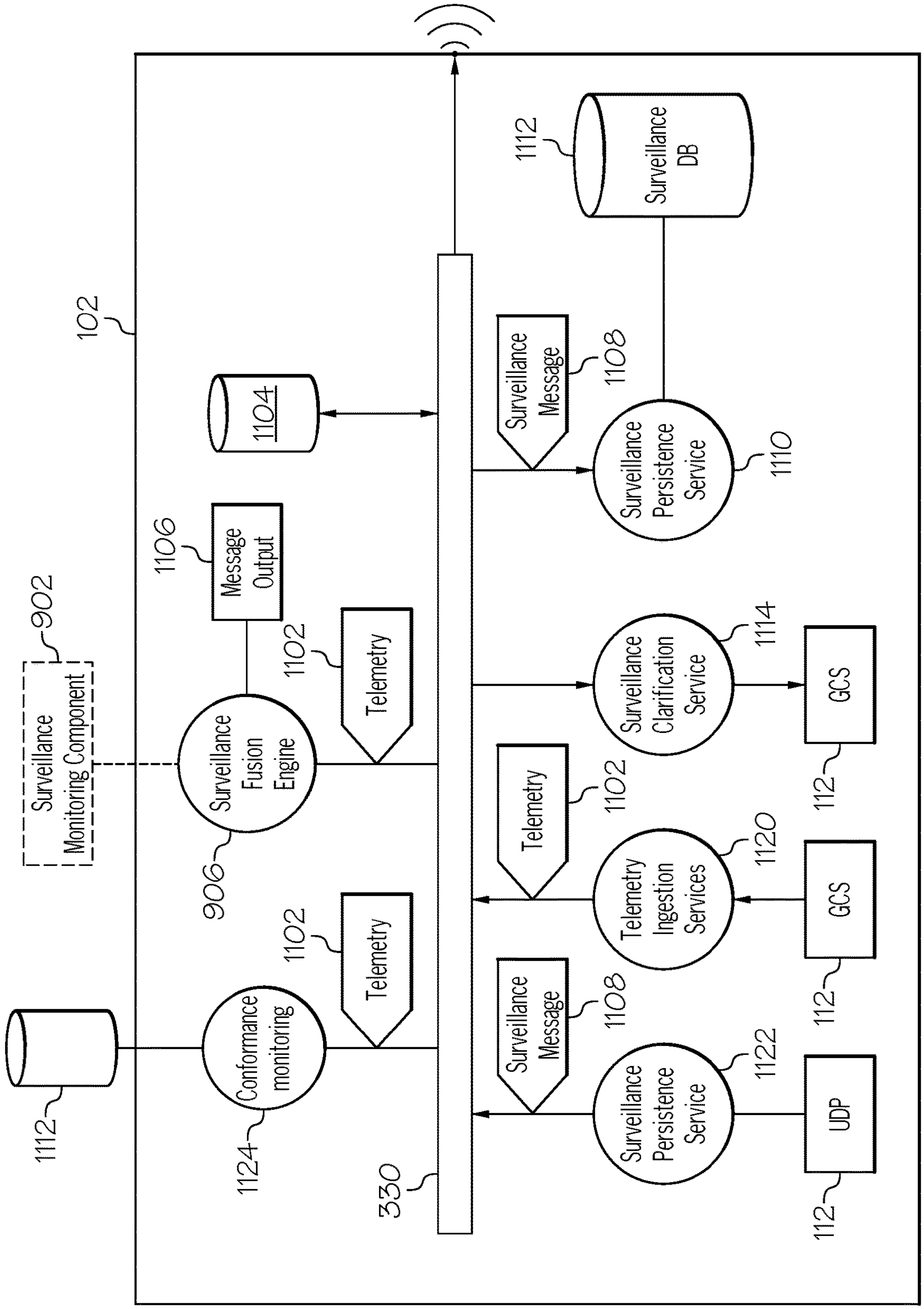
FIG. 11 depicts a surveillance fusion engine for providing surveillance services for a vehicle, according to embodiments provided herein.

FIG. 11 depicts a surveillance fusion engine 906 for providing surveillance services for a vehicle, according to embodiments provided herein. As illustrated, the air mobility platform 102 includes the surveillance fusion engine 906 and may be configured for data exchange and communication over multi-level bus 330. As illustrated, the surveillance fusion engine 906 may receive vehicle-sensed data from the surveillance monitoring component 902, such as in conjunction with telemetry data 1102 (ground-based or third party in-air), to allow for proper surveillance tracking. In accordance with this telemetry data 1102, the surveillance fusion engine 906 may draw on one or more databases 1104 indicative of suitable behavior for a vehicle, such as based on vehicle type and including maneuvering capabilities for aerial vehicles 203. Embodiments may combine this data with surveilled data from the surveillance monitoring component 902 to generate one or more surveillance messages 1108 stored in message queue 1106.

The surveillance messages 1108 may additionally send data to the multi-level bus 330 for combination with the telemetry data 1102 such as may be provided both from the surveillance monitoring component 902, as well as from third party data sources 104, such as a UTM or other ground-based control systems. As such, the surveillance messages 1108 may provide a compliance report with the contracted flight plan, as well as any necessary modifications to the contracted flight plan.

Also coupled to the multi-level bus 330 is a surveillance persistence service component 1110, which may be coupled to data storage device 1104 via the multi-level bus 330 as well as a surveillance database 1112. A surveillance clarification service component 1114 may be coupled to the multi-level bus 330. A surveillance persistence service component 1122, may be coupled to the multi-level bus 330 and may communicate the surveillance message 1108 therewith. A conformance monitoring component 1124 is also coupled to the multi-level bus 330 and may communicate the telemetry data 1102 therewith. A telemetry ingestion services engine 1120 may also communicate telemetry data with the multi-level bus 330.

Upon combination and processing of the foregoing data, surveilled information may be output, as may be flight plan conformance. As discussed above, to the extent conformance is lacking, information may be uplinked to one or more aerial vehicles 203 in flight, such as to indicate flight plan modifications or evasive maneuvers, or to alert the aerial vehicles 203 to nonconformance with contracted flight plans, such that the aerial vehicles 203 may modify flight to return to conformance.

Figure 12:
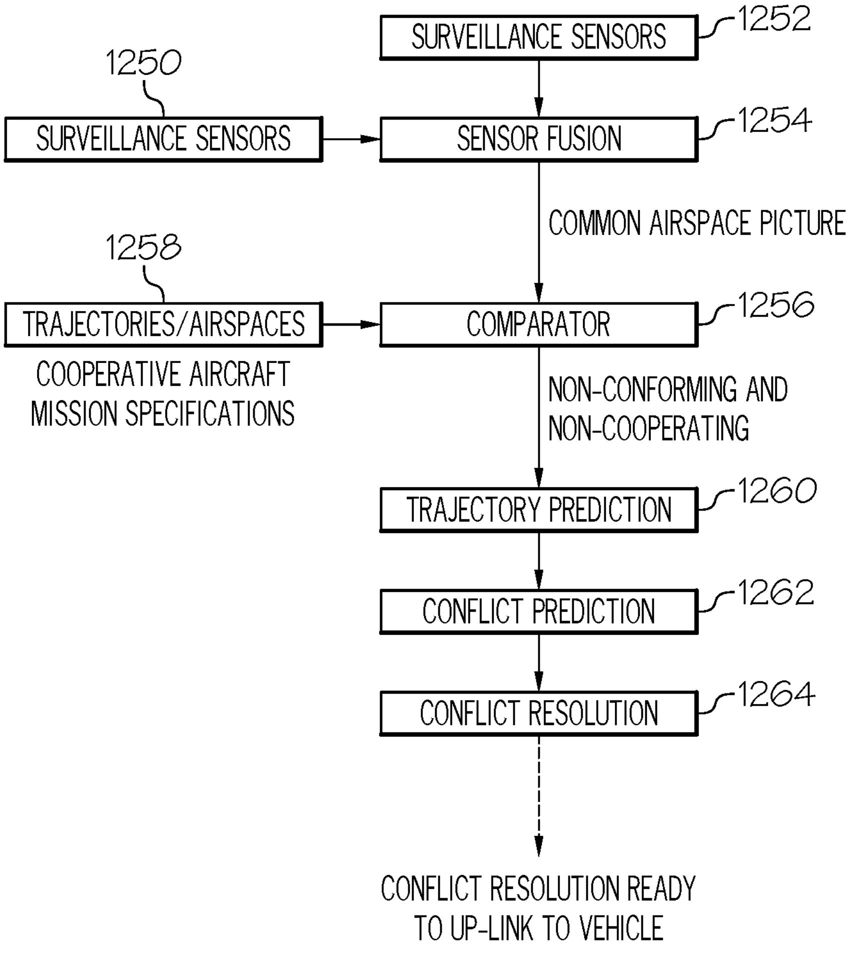
FIG. 12 depicts a flow diagram illustrating conflict resolution of various vehicles, according to embodiments described herein.

FIG. 12 depicts a flow diagram illustrating conflict resolution of aerial vehicles 203, 904, according to embodiments described herein. As illustrated, surveillance sensors 1250 (which may be airborne) and surveillance sensors 1252 (which may include one or more ground-based sensor) may send data to the air mobility platform 102, which may perform sensor fusion 1254 to determine at least one characteristic of the vehicle and provide a common airspace picture. This information is sent to a comparator 1256, which also receives trajectories and/or airspaces of cooperative aircraft mission specifications. A trajectory prediction 1260 of non-conforming and non-cooperating aircraft may be performed. Conflict prediction 1262 may be performed and a conflict resolution 1264 may be determined and sent to the vehicle.

Figure 13:
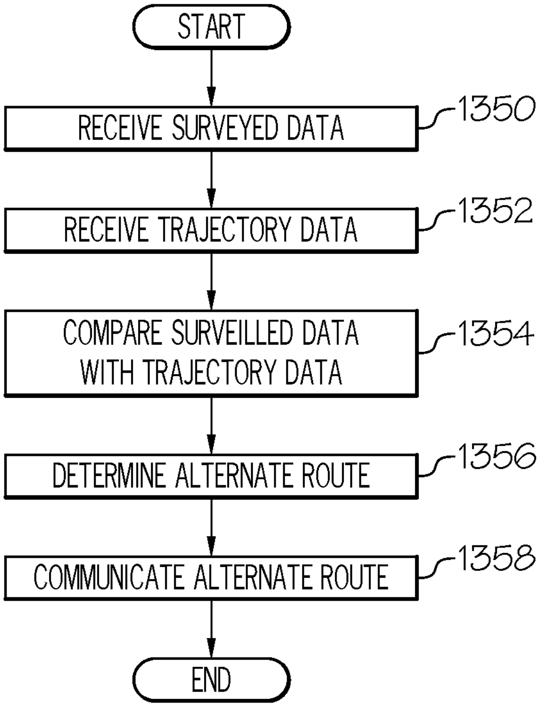
FIG. 13 depicts a flow diagram illustrating deconfliction for a plurality of aerial vehicles, according to embodiments described herein.

FIG. 13 depicts a flow diagram illustrating deconfliction for a plurality of aerial vehicles 203, 904, according to embodiments described herein. As illustrated in block 1350, surveilled data is received from a surveillance monitor regarding the unmanned aerial vehicle 203 and at least one other aircraft. In block 1352, trajectory data may be received from at least one trajectory data source. In block 1354, the surveilled data may be compared with the trajectory data to determine whether the unmanned aerial vehicle 203 is on path to collide with a third party aerial vehicle 904. In block 1356, in response to determining that the unmanned aerial vehicle 203 is on path to collide with a third party aerial vehicle 904 an alternate route for the unmanned aerial vehicle 203 may be determined. In some embodiments, the alternate route may include a trajectory modification. In block 1358, at least a portion of the alternate route may be communicated to the unmanned aerial vehicle 203.

Figure 14:
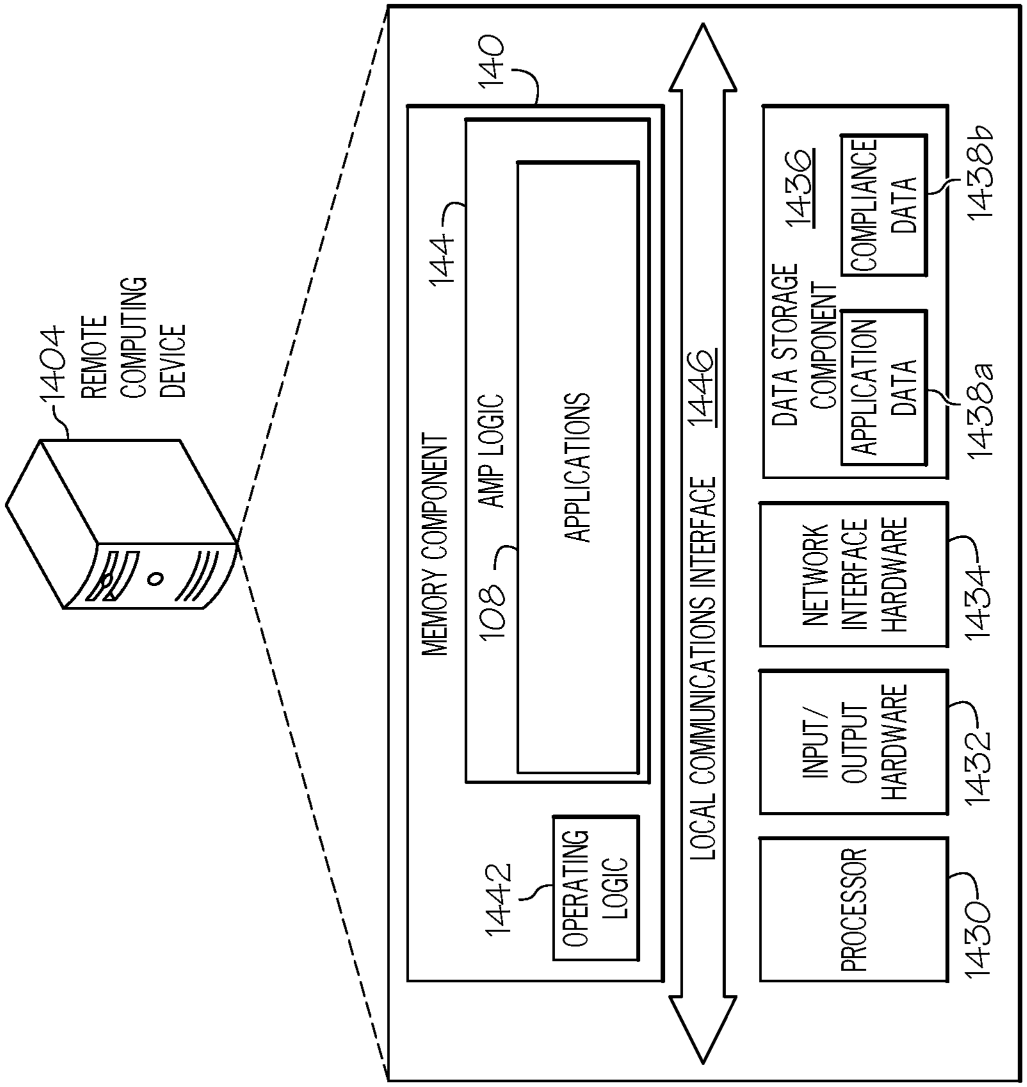
FIG. 14 depicts a remote computing device that may be utilized for providing surveillance services for unmanned aerial vehicle, according to embodiments provided herein, according to embodiments provided herein.

FIG. 14 depicts a remote computing device 1404 that may be utilized for providing surveillance services for unmanned aerial vehicle, according to embodiments provided herein. As illustrated, the remote computing device 1404 may be configured to provide the air mobility platform 102 and thus includes a processor 1430, input/output hardware 1432, network interface hardware 1434, a data storage component 1436, which stores application data 1438*a*, compliance data 1438*b*, and/or other data, and the memory component 1440. The application data 1438*a* may include airspace data, an approved waiver kit, registered aircraft data, and approved UAS data as described with reference to FIG. 2 and/or other data. The compliance data 1438*b* may include similar data that may be utilized to monitor compliance of the aerial vehicle 203, 904 when in use. The memory component 1440 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 1404 and/or external to the remote computing device 1404.

The memory component 1440 may store operating system logic 1442 and AMP logic 1444, which may include the applications 108 (FIG. 1). As illustrated, the AMP logic 1444 may include a plurality of different pieces of logic, each of which may be embodied as a computer program or module, firmware, and/or hardware, as an example. A local interface 1446 is also included in FIG. 14 and may be implemented as a bus or other communication interface to facilitate communication among the components of the remote computing device 1404.

The processor 1430 may include any processing component operable to receive and execute instructions (such as from a data storage component 1436 and/or the memory component 1440). As described above, the input/output hardware 1432 may include and/or be configured to interface with the components of FIG. 14.

The network interface hardware 1434 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 1404 and other computing devices, such as those depicted herein.

The operating system logic 1442 may include an operating system and/or other software for managing components of the remote computing device 1404. As discussed above, the AMP logic 1444 may reside in the memory component 1440 and may be configured to cause the processor 1430 to provide a platform for a user and/or administrator to submit an approval application, as described above. Similarly, the AMP logic 1444 may be utilized to monitor operation of the aerial vehicle 203, 904 to ensure compliance with the regulations for which the user and/or the aerial vehicle 203, 904 were approved, and/or provide other similar functionality.

It should be understood that while the components in FIG. 14 are illustrated as residing within the remote computing device 1404, this is merely an example. In some embodiments, one or more of the components may reside external to the remote computing device 1404. It should also be understood that, while the remote computing device 1404 is illustrated as a single device, this is also merely an example. In some embodiments, the applications 108 may reside on different computing devices. As another example, one or more of the functionalities and/or components described herein may be provided by a remote computing device 1404 and/or other computing devices described herein. These devices may also include hardware and/or software for performing the functionality described herein.

Additionally, while the embodiments described herein are described with the applications 108 each as separate logical components, this is also an example. In some embodiments, a single piece of logic (or multiple pieces of logic) may cause the desired computing device to provide the described functionality.

Further aspects of the invention are provided by the subject matter of the following clauses:

A computer-implemented system for providing surveillance services for an unmanned aerial vehicle, comprising: an air mobility platform comprising: a surveillance fusion engine that receives surveilled data from a surveillance monitor regarding the unmanned aerial vehicle and at least one other aircraft; a comparator for comparing the surveilled data with trajectory data from at least one trajectory data source to determine whether the unmanned aerial vehicle is on path to collide with a third party aerial vehicle and, in response to determining that the unmanned aerial vehicle is on path to collide with the third party aerial vehicle, determine an alternate route for the unmanned aerial vehicle; and a surveillance uplink application configured to communicate at least a portion of the alternate route to the unmanned aerial vehicle.

The computer-implemented system of any preceding clause, further comprising at least one surveillance sensor that collects the surveilled data.

The computer-implemented system of any preceding clause, wherein the at least one surveillance sensor is configured as at least one of the following: a ground-based or an airborne.

The computer-implemented system of any preceding clause, wherein the computer-implemented system further receives the trajectory data from the at least one trajectory data source that includes a flight contract of the unmanned aerial vehicle.

The computer-implemented system of any preceding clause, wherein determining the alternate route includes a trajectory modification.

The computer-implemented system of any preceding clause, wherein the surveillance uplink application is further configured to determine that the third party aerial vehicle is cooperative and to communicate the alternate route to the third party aerial vehicle.

The computer-implemented system of any preceding clause, wherein the surveillance uplink application is further configured to determine that the third party aerial vehicle is non-cooperative and based on that determination, not to communicate the alternate route to the third party aerial vehicle.

The computer-implemented system of any preceding clause, wherein, in determining the alternate route, the computer-implemented system further determines maneuvering capabilities.

The computer-implemented system of any preceding clause, wherein the air mobility platform includes a multi-level bus and wherein the surveillance uplink application and the surveillance fusion engine communicates over separate levels of the multi-level bus.

The computer-implemented system of any preceding clause, further comprising a user computing device that that provides the alternate route to the unmanned aerial vehicle.

A method for providing surveillance services for an unmanned aerial vehicle, comprising: receiving, by a computing device, surveilled data from a surveillance monitor regarding the unmanned aerial vehicle and at least one other aircraft; receiving, by the computing device, trajectory data from at least one trajectory data source; comparing, by the computing device, the surveilled data with the trajectory data to determine whether the unmanned aerial vehicle is on path to collide with a third party aerial vehicle; in response to determining that the unmanned aerial vehicle is on path to collide with the third party aerial vehicle, determining, by the computing device, an alternate route for the unmanned aerial vehicle; and communicating, by the computing device, at least a portion of the alternate route to the unmanned aerial vehicle.

The method of any preceding clause, wherein determining the alternate route includes a trajectory modification.

The method of any preceding clause, further comprising determining, by the computing device, that the third party aerial vehicle is cooperative and communicating the alternate route to the third party aerial vehicle.

The method of any preceding clause, further comprising determining, by the computing device, that the third party aerial vehicle is non-cooperative and based on that determination, refraining from communicating the alternate route to the third party aerial vehicle.

The method of any preceding clause, wherein determining the alternate route includes determining maneuvering capabilities.

A non-transitory computer-readable medium that stores logic that, when executed by a computing device, causes the computing device to perform at least the following: receive surveilled data from a surveillance monitor regarding an unmanned aerial vehicle and at least one other aircraft; receive trajectory data from at least one trajectory data source; compare the surveilled data with the trajectory data to determine whether the unmanned aerial vehicle is on path to collide with a third party aerial vehicle; in response to determining that the unmanned aerial vehicle is on path to collide with the third party aerial vehicle, determine an alternate route for the unmanned aerial vehicle; and communicate at least a portion of the alternate route to the unmanned aerial vehicle.

The non-transitory computer-readable medium of any preceding clause, wherein determining the alternate route includes a trajectory modification.

The non-transitory computer-readable medium of any preceding clause, wherein logic further causes the computing device to determine that the third party aerial vehicle is cooperative and to communicate the alternate route to the third party aerial vehicle.

The non-transitory computer-readable medium of any preceding clause, wherein the logic is further causes the computing device to determine that the third party aerial vehicle is non-cooperative and not to communicate alternate route to the third party aerial vehicle.

The non-transitory computer-readable medium of any preceding clause, wherein determining the alternate route includes determining maneuvering capabilities.

The invention claimed is:

1. A computer-implemented system for providing surveillance services for an unmanned aerial vehicle, comprising:
- an air mobility platform that includes a processor and a memory component, the memory component storing logic comprising:
  - a multi-level bus that is configured as a layered bus for handling different service levels of information and handling different applications operating at different layers;
  - a surveillance fusion engine that receives surveilled data from a surveillance monitor regarding the unmanned aerial vehicle and a third party aerial vehicle and trajectory data from at least one trajectory data source via the multi-level bus and performs sensor fusion of the surveilled data and the trajectory data to determine whether the unmanned aerial vehicle is not currently conforming to a first contracted flight plan and whether the third party aerial vehicle is currently conforming to a second contracted flight plan;
  - a comparator for determining whether the unmanned aerial vehicle is on path to collide with the third party aerial vehicle and, in response to determining that the unmanned aerial vehicle is on path to collide with the third party aerial vehicle, if the third party aerial vehicle is not currently conforming to the second contracted flight plan, determine that only the unmanned aerial vehicle may comply with a change to a flight plan, and determine a first alternate route for the unmanned aerial vehicle and a second alternate route for the third party aerial vehicle; and
  - a surveillance uplink application configured to communicate at least a portion of the first alternate route to the unmanned aerial vehicle and at least a portion of the second alternate route to the third party aerial vehicle.

2. The computer-implemented system of claim 1, further comprising at least one surveillance sensor that collects the surveilled data.

3. The computer-implemented system of claim 2, wherein the at least one surveillance sensor is configured as at least one of the following: ground-based or an airborne.

4. The computer-implemented system of claim 1, wherein the computer-implemented system further receives the trajectory data from the at least one trajectory data source that includes a flight contract of the unmanned aerial vehicle.

5. The computer-implemented system of claim 1, wherein determining the first alternate route includes a trajectory modification.

6. The computer-implemented system of claim 1, wherein the surveillance uplink application is further configured to determine that the third party aerial vehicle is cooperative and to communicate the second alternate route to the third party aerial vehicle.

7. The computer-implemented system of claim 1, wherein, in determining the first alternate route, the computer-implemented system further determines maneuvering capabilities.

8. The computer-implemented system of claim 1, wherein the surveillance uplink application and the surveillance fusion engine communicates over separate levels of the multi-level bus.

9. The computer-implemented system of claim 1, further comprising a user computing device that that provides the first alternate route to the unmanned aerial vehicle.

10. A method for providing surveillance services for an unmanned aerial vehicle, comprising:

receiving, by a computing device, surveilled data from a surveillance monitor regarding the unmanned aerial vehicle and a third party aerial vehicle;

receiving, by the computing device, trajectory data from at least one trajectory data source via a multi-level bus that is configured as a layered bus for handling different service levels of information and handling different applications operating at different layers;

performing, by the computing device, sensor fusion of the surveilled data and the trajectory data to determine whether the unmanned aerial vehicle is currently conforming to a first contracted flight plan and whether the third party aerial vehicle is currently conforming to a second contracted flight plan;

comparing, by the computing device, the surveilled data with the trajectory data to determine whether the unmanned aerial vehicle is on path to collide with the third party aerial vehicle;

in response to determining that the third party aerial vehicle is not currently conforming to the second contracted flight plan and is on path to collide with the unmanned aerial vehicle, determining that the third party aerial vehicle may not cooperate with a change in the second contracted flight plan and determining, by the computing device, a first alternate route for the unmanned aerial vehicle and a second alternate route for the third party aerial vehicle; and communicating, by the computing device, at least a portion of the first alternate route to the unmanned aerial vehicle and at least a portion of the second alternate route to the third party aerial vehicle.

11. The method of claim 10, wherein determining the first alternate route includes a trajectory modification.

12. The method of claim 11, further comprising determining, by the computing device, that the third party aerial vehicle is cooperative and communicating the second alternate route to the third party aerial vehicle.

13. The method of claim 10, wherein determining the first alternate route includes determining maneuvering capabilities.

14. A non-transitory computer-readable medium that stores logic that, when executed by a computing device, causes the computing device to perform at least the following:

receive surveilled data from a surveillance monitor regarding an unmanned aerial vehicle and a third party aerial vehicle;

receive trajectory data from at least one trajectory data source via a multi-level bus that is configured as a layered bus for handling different service levels of information and handling different applications operating at different layers;

perform sensor fusion of the surveilled data and the trajectory data to determine that the unmanned aerial vehicle is currently conforming to a first contracted flight plan and the third party aerial vehicle is not currently conforming to a second contracted flight plan;

compare the surveilled data with the trajectory data to determine whether the unmanned aerial vehicle is on path to collide with the third party aerial vehicle;

in response to determining that the unmanned aerial vehicle is on path to collide with the third party aerial vehicle, determine that since the third party aerial vehicle is not currently conforming to the second contracted flight plan, the third party aerial vehicle may not comply with a change in the second contracted flight plan, determine a first alternate route for the unmanned aerial vehicle and a second alternate route for the third party aerial vehicle; and communicate at least a portion of the first alternate route to the unmanned aerial vehicle and at least a portion of the second alternate route to the third party aerial vehicle.

15. The non-transitory computer-readable medium of claim 14, wherein determining the first alternate route includes a trajectory modification.

16. The non-transitory computer-readable medium of claim 14, wherein logic further causes the computing device to determine that the third party aerial vehicle is cooperative and to communicate the second alternate route to the third party aerial vehicle.

17. The non-transitory computer-readable medium of claim 14, wherein determining the first alternate route includes determining maneuvering capabilities.

* * * * *